United States Patent [19]
Gorokhovsky et al.

[11] Patent Number: 5,505,235
[45] Date of Patent: Apr. 9, 1996

[54] CONTAINER HAVING A BREAKABLE POURING CAP

[76] Inventors: Mark Gorokhovsky, 490 - 33rd Ave. #206; Semyon Spektor, 766 -33rd Ave., both of San Francisco, Calif. 94121; Gennady Gorokhovsky, 1290-25th Ave. #203, San Francisco, Calif. 94122

[21] Appl. No.: 199,719

[22] Filed: Feb. 22, 1994

[51] Int. Cl.⁶ .................................................. B65D 25/08
[52] U.S. Cl. ........................... 141/319; 141/329; 222/81; 222/541.6
[58] Field of Search ................... 141/1, 98, 21, 141/372, 364, 352, 351, 329, 363; 215/250, 257, 214, 224, 225; 220/277; 222/541, 81; 206/222

[56] References Cited

U.S. PATENT DOCUMENTS

| | | | |
|---|---|---|---|
| 4,949,857 | 8/1990 | Russell | 141/114 |
| 4,991,634 | 2/1991 | Tudek | 141/98 |
| 5,316,058 | 5/1994 | Spektor et al. | 222/541 |

FOREIGN PATENT DOCUMENTS

| | | | |
|---|---|---|---|
| 2047491 | 1/1993 | United Kingdom | 220/277 |

*Primary Examiner*—Henry J. Recla
*Assistant Examiner*—Timothy L. Maust

[57] ABSTRACT

A container having a breakable pouring cap (116) for pouring oil into an oil tank (114). The cap (112) is snapped onto a neck portion (116) through the engagement of an inner projection (146) on the open end of the cap (112) and an outward annular projection (122) on the neck portion (116) of the container. The cap is sealed by means of a pair of annular radial projections (122 and 124) on the outer surface of the neck portion (116) of the container, these projections having sliding fit with the inner surface of the cap (112). The end face of the neck portion (116) is skewed and forms a piercing tip (130) at its lowermost end and a cutting edge (128) on the remaining peripheral portion of the end face. In use, the container is inserted in an inverted position so that the breakable cap extends into an inlet opening (111), e.g., of the oil tank. Radial ribs (142) are wedged in the inlet opening by applying an axial force to the container body (110), and the body is then pushed down, whereby the piercing tip (130) pierces the bottom portion (134) of the cap; with the further downward movement of the container, the cutting edge (128) shears the bottom portion and thus opens the container, allowing the oil to flow into the motor oil tank (114). In another embodiment, the cap and the neck are provided with additional sealing means in the form of inner radial segments (302 and 304) on inner surface of the cap and outer projections (306 and 308) on the neck. When the cap is snapped onto the neck and then is twisted, the segments and projections form a tight fit.

4 Claims, 7 Drawing Sheets

CONTAINER HAVING A BREAKABLE POURING CAP

BACKGROUND—FIELD OF THE INVENTION

The present invention relates to a container for holding liquid material, particularly, to a container with a breakable pouring cap for dispensing a liquid from the container in its inverted position into a receiving tank.

BACKGROUND—DESCRIPTION OF PRIOR ART

The efficient delivery of oil to the inlet of an oil tank of an engine of an automotive vehicle is difficult to achieve in practice, in view of the complexity of automobile engines, which often have poorly-accessible oil inlets. Thus, it is difficult to avoid the spilling, spattering, or dripping of oil onto the adjacent engine parts, the clothes of the user, and the ground; this mars the engine's appearance and significantly contributes to the contamination of the environment.

Most often, the motor oil sump is filled with oil by using an oil container with a removable threaded cover. The oil is poured into the engine through an oil-filling port directly, or by using a funnel. Customarily, a user holds the funnel in one hand and the container of oil in the other hand. Because of its high viscosity and the need to let air into the container, the oil flows slowly and in spurts. Since the funnel has a tendency to block the flow of air to the oil tank, the user often resorts to raising the funnel to form an air gap between the funnel and the oil inlet hole of the engine.

Upon the completion of the oil pouring operation, three dirty, oily parts remain, i.e., a funnel which has to be kept in the car trunk, an empty oil container, and its threaded cap. The funnel must be cleaned and wiped, while the container and its cap must be discarded.

The pouring operation described above is inconvenient, requires two hands, leaves the user with dirty hands and sometimes clothing, causes the splashing of oil, and is disadvantageous from the point of view of environmental purity and safety.

U.S. Pat. No. 4,979,655, issued in December 1990 to D. Gallucci, describes a pouring cap which is screwed onto a threaded neck of an oil container for pouring in an inverted position. The cap has a tubular shape, one end of which is connected to the oil container and the other end of which has a dispensing opening and a closure sleeve. The closure sleeve is slidingly moveable between a first position, in which the dispensing opening is blocked, and a second position, in which the dispensing opening is open.

Since the closure sleeve is slidingly fitted onto the tube, the connection between the closure sleeve and the tube is not sealed against the leakage of oil.

The assembly of a container with the pouring cap consists of three separate parts, i.e., the container, the tubular portion, and the closure sleeve. The pouring cap is complicated in structure, expensive to manufacture, and the presence of a long tubular portion increases the length of the cap as a whole.

The same patent discloses another embodiment in which the closure sleeve and the tube have a bayonet joint in the form of a pin, pressed into the tube, and an angular slot, formed in the closure sleeve. This embodiment requires an additional assembly operation of pressing the pin into the tube.

The disadvantages of the containers with pouring caps are eliminated in a container having a pouring spout which is described in pending U.S. patent application Ser. No. 7/944,960 filed on Sep. 15, 1992 by Semyon Spektor, et al. now U.S. Pat. No. 5,316,058. FIG. 1 is a fragmental sectional view of the pouring portion of the container described in the above-mentioned patent application.

The container has a body 10 and a cap 12 and terminates in a neck portion 16. Neck portion 16 comprises a main cylindrical part 38 which has an annular shoulder 40 of a diameter larger than main cylindrical part 38 of neck portion 16. The end of neck portion 16 has a small-diameter part 42, the diameter of which is smaller than the diameter of main part 38. The embodiment of FIG. 1 shows a two-step small-diameter part 42 which consists of portions 42a and 42b. The above-mentioned steps have diameters decreasing toward the end of neck portion 16.

Neck portion 16 is closed with a cap 24. The cap is cup-shaped and has a closed end or bottom portion 29. Cap 24 has a large-diameter part 46 and a small-diameter part 48.

Large-diameter part 46 of cap 24 is longer, e.g., by ⅛ to ¼ of its length in the axial direction of the container, than respective large-diameter part 40 of the neck portion.

Cap 24 has radial ribs 32 which taper toward the end of the neck portion. The open end of cap 24 has inner projection 50. An inner diameter of the projection portion is smaller than an outer diameter of large-diameter part 46 of neck portion 16, so that cap 24 can be snapped onto neck portion 16.

An axial distance from inner projection 50 to an inner surface 52 of a bottom portion 29 is equal to or slightly larger than the distance from the upper end of large-diameter part 40 to the end of small-diameter part 42b. As a result, when cap 24 is put onto container neck portion 16 and pushed down, bead or projection 50 is snapped onto large-diameter part 40 of neck portion 16, keeping the cap in a fixed position on the Container. When cap 24 is snapped onto the container neck, the end of small diameter portion 42b either contacts bottom portion 29 or is spaced from it at a distance which is shorter than the difference between the length of large-diameter part 46 of the cap and large-diameter part 40 of the neck portion. Bottom portion 29 may have a circular scoring groove (not shown) of a diameter equal to or greater than small-diameter part 42b of neck portion 16.

A sealing band 25 is used with cap 24. Sealing band 25 is located on neck portion 16 of the container body, just above the upper end face of cap 24, i.e., above inner projection 50.

In order to fill the oil tank of an engine with oil O, the motor oil tank is opened, the container is inverted, and its cap 12 is inserted into an inlet opening 11 of the oil tank so that ribs 32 are centered on the edges of an oil tank inlet opening 14 and form gaps 34 between opening 11 and the outer surface of cap 24. Gaps 34 connect the surrounding atmosphere with the interior of the oil tank. A slight pressure is then applied to container body 10 to wedge ribs 32 in opening 11 and thus fix cap 12 immovably with respect to tank 14, with a force sufficient to keep cap 24 stationary when container body 10 is shifted further downward in the axial direction.

A force C which is directed downward is then applied manually to container body 10a. This force, which is within the range of 0.75 to 1.50 kg, causes axial displacement of body 10 in the direction of arrow C, i.e., body 10 is displaced towards opening 11. Sealing band 25 is broken, body 10 is moved down and unsnaps inner projection 50 from the recess formed by the shoulder of large-diameter part 40. Since the lower end face of small-diameter portion 42b of body 10 of FIG. 1 is in contact with bottom portion 29, further axial movement of body 10 will break prescored or thinned breakable parts of bottom portion 29.

As a result, the container will open and oil O will pour out into the oil tank. Since, as has been mentioned above, large-diameter part 46 of cap 24 is longer than respective large-diameter part 40 of the neck portion, it will have an axial stroke sufficient for breaking the breakable part of the bottom portion of the cap. If the container body is moved further after opening the container, the lower shoulder of large diameter portion 42a will rest on the remaining, i.e., unbroken, part of bottom portion 29, so that further movement of container body 10 will be impossible.

The presence of air gaps 34 will accelerate the flow of the viscous oil from the container into the tank. The hands and clothes of the user will remain clean and will not come into contact with oil or dirty parts. Broken part 29 will remain attached to cap 24 at an unbroken portion in the form of a part 29a which is shown in FIG. 1 by broken lines. As a result, upon completion of the filling operation, the empty container will remain integrally connected to all parts, i.e., to cap 24 and broken portion 29a. This facilitates disposal of the used container.

When the operation is completed, the user pulls container body 10 upwardly and disengages pouring element 12 from opening 11. The container with its cap still attached is then discarded in a one-step operation.

In spite of the above advantages of the container disclosed in U.S. patent application Ser. No. 07/944,960, this device still possesses an essential drawback, in that it requires the use of an externally located and manually-breakable sealing band, or any other separable individual sealing element, as an indispensable part of the container closure. Without such a sealing band the use of cap 24 will not protect the contents of the container from leaking through the gaps between cap 24 and neck portion 16.

Another disadvantage of the above-described container is that, in spite of the provision of a breakable prescored portion on the bottom part of the cap, in reality it requires the application of a significant force to break the above-mentioned breakable portions.

OBJECTS AND ADVANTAGES OF THE INVENTION

It is therefore an object of the invention to eliminate the above disadvantages and to provide a container having a pouring cap in which the connection between the neck portion and the cap can be reliably sealed without the use of an individual externally located and manually breakable sealing element.

Another object is to reduce the amount of force required to open the pouring cap.

Still another object is to provide a container with an internally sealed breakable cap which is protected from unintended opening.

Other advantages and features of the invention will become apparent from a consideration of the ensuing description and drawings.

BRIEF DESCRIPTION OF DRAWINGS

FIG. 2—DETAILED DESCRIPTION OF THE POURING CONTAINER OF THE INVENTION

FIG. 2 shows a pouring container of the invention in an inverted position with its cap inserted into an inlet opening 111 of an oil tank 114 of an automobile engine, in order for the oil to be poured into the tank.

Figure 1:
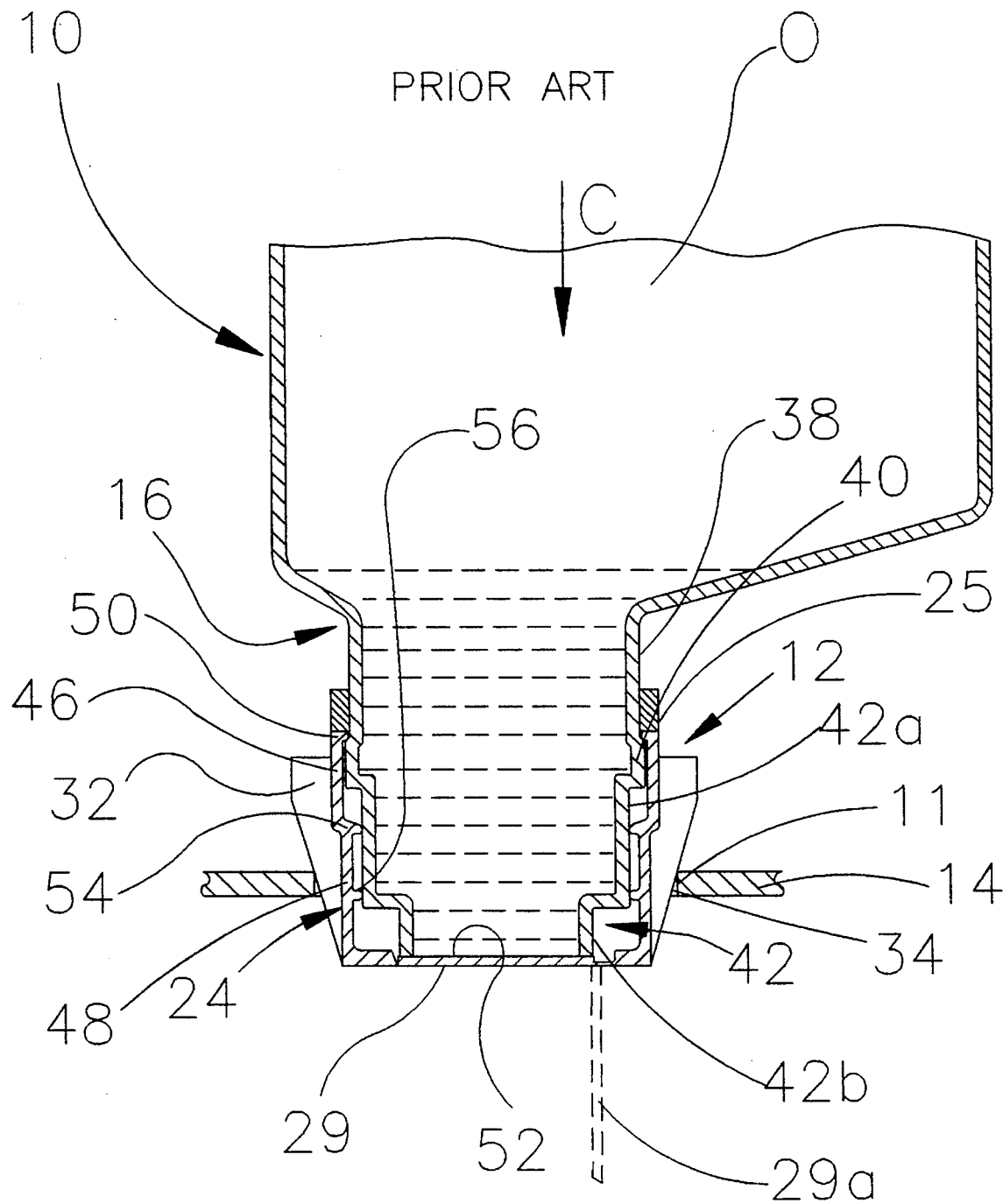
FIG. 1 is a fragmental sectional view of a known container with a breakable pouring cap.
Figure 2:
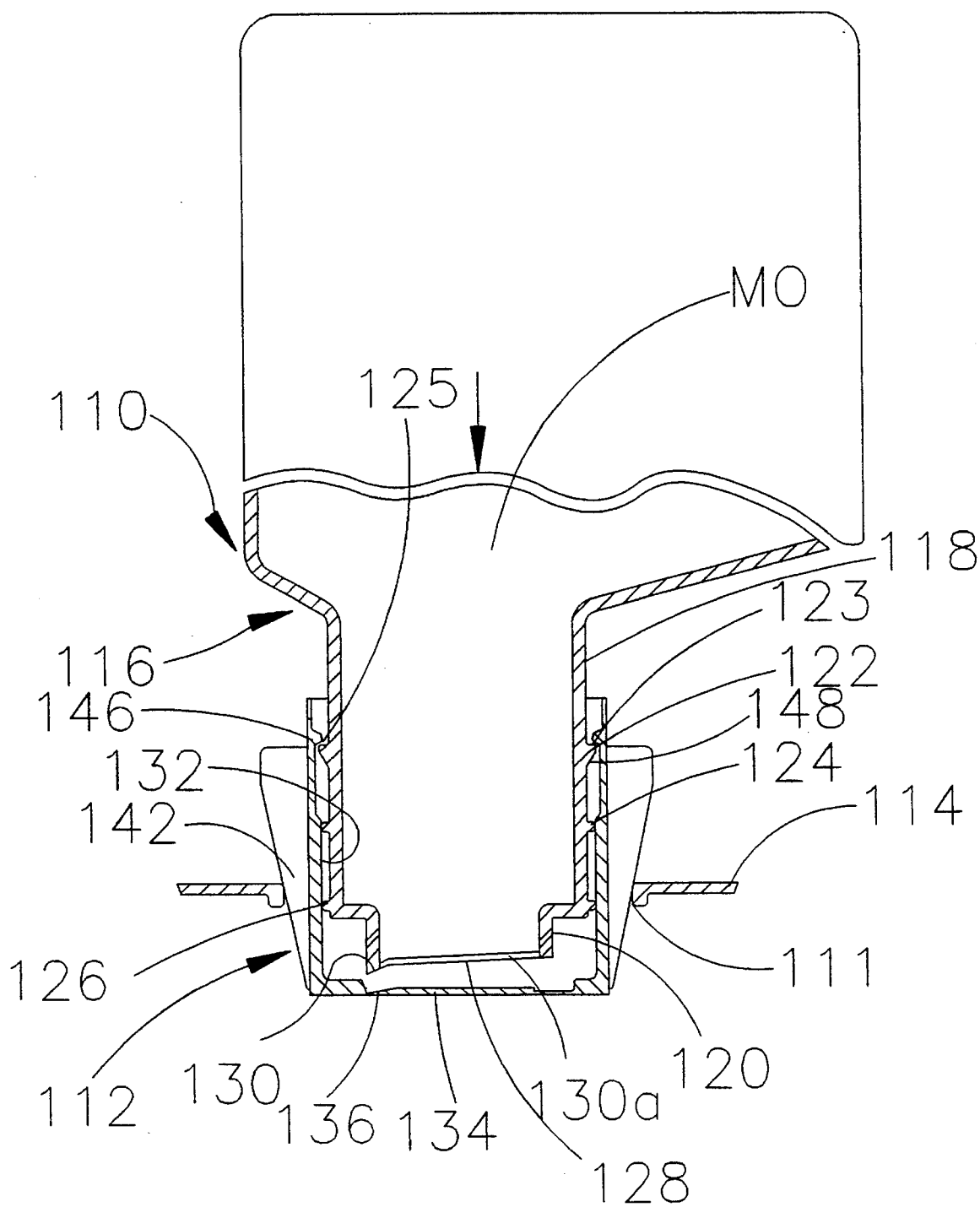
FIG. 2 is a fragmental sectional view of the container of the invention with a breakable pouring cap in the closed position.

The pouring container consists of a container body 110 (only a part of which is shown in FIG. 2) and a cap 112. Container body 110 contains a material to be dispensed, e.g., motor oil MO. The container body may be made of glass, but is preferably molded from a plastic material, such as polyethylene or the like, normally used for conventional oil-containing bottles or containers.

Container body 110 terminates in a cylindrical neck 116 which consists of two portions, i.e., a large-diameter portion 118 and a small-diameter portion 120, the latter being formed at the very end of neck 116.

On its intermediate part, large-diameter portion 118 has an annular outward radial projection 122 and two annular outward projections 124 and 126 which are located below projection 122 in the position of the container shown in FIG. 2, i.e., closer to small-diameter portion 120.

The very end of small-diameter portion 120 has a skewed end-face 128 which forms a piercing tip 130 at the lowermost point of neck 116 in the position of FIG. 2. The remaining part of end face 128 forms a cutting edge 130a over the entire periphery of the end face 128, except for a part corresponding to an unbreakable portion 140, which will be described later with reference to FIG. 3.

Figure 3:
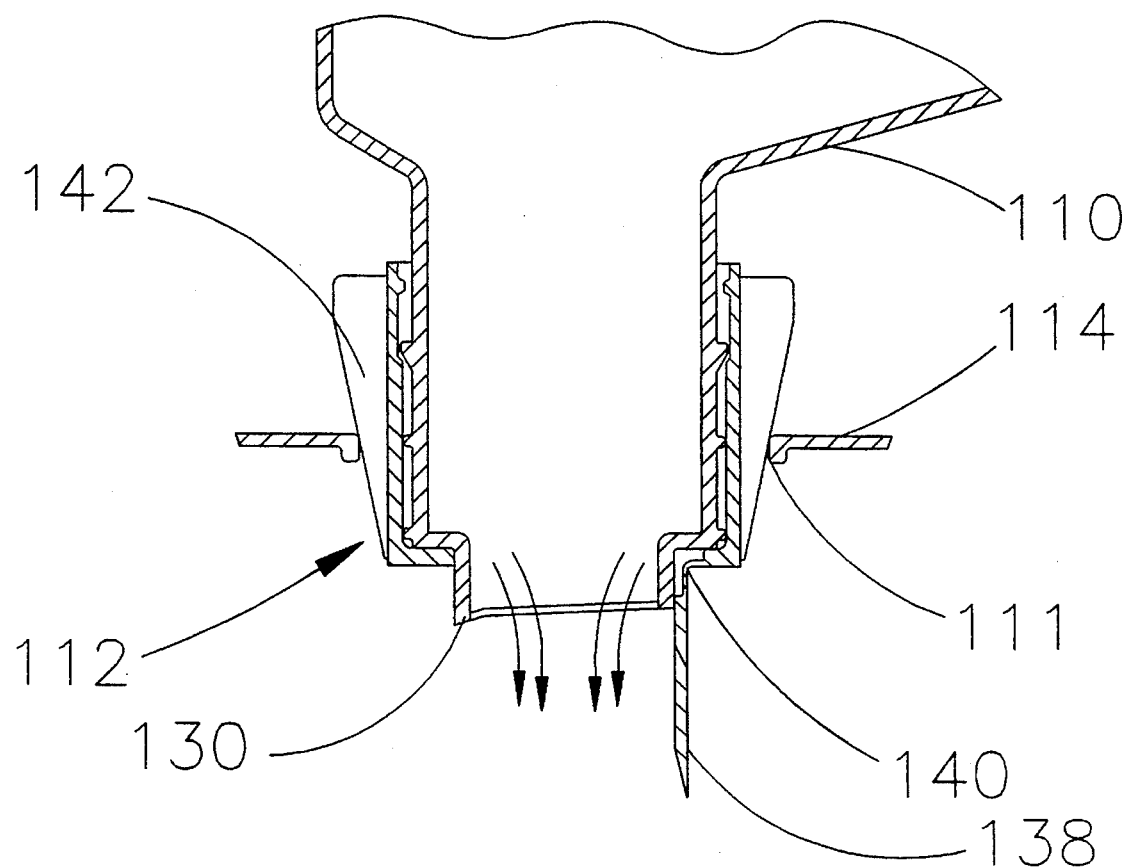
FIG. 3 is a view similar to FIG. 2 with the pouring cap in the open position.

Cap 112 is a cup-shaped cylindrical body with a cylindrical wall 132 and a bottom portion 134. Bottom portion 134 is prescored as shown by a groove 136. In order to prevent broken portion 138 (which is shown in FIG. 3) from falling into the oil tank, groove 136 does not form a complete circle but contains the above-mentioned unbreakable portion 140, e.g., 1/10 of the circle, unscored, so that after the opening of cap 112, and hence of the container, portion 138 remains attached to the cap and does not fall into the oil tank. This also means that an additional oily part, i.e., broken portion 138, is not separated from the container and is left connected thereto when the container is discarded after use.

Cap 112 has radial ribs 142 which taper toward bottom portion 134 of the cap. The number of ribs 142 may vary, but in general it may be three to six ribs. Ribs 142 fulfill two functions: they stabilize the container when it is inserted into opening 111 of oil tank 114 and they form gaps (identical to gaps 144 shown in FIG. 5, which relates to the second embodiment of the invention which will be described later) between the inner walls of opening 111 and the outer surface of cap 112 in order to allow the air to escape from the oil tank, thus accelerating the oil dispensing operation.

On its inner surface, cylindrical wall 132 of cap 112 has a first radial inward projection 146 which has inner diameter smaller than the outer diameter of projection 122 on neck 116. A distance L from an upper surface 123 of projection 122 to the end of cutting edge 130a of small-diameter portion 120 must be equal or slightly shorter, e.g., by 1–2 mm, than the distance from a lower surface 125 of projection 146 of cap 112 to the end of cutting edge 130a. Thus, when, after filling container body 110 with an oil or any other required liquid, cap 112 is placed over neck 116 and pushed onto it, projection 146 slides over a tapered lower surface 148 of projection 122 and is snapped on the neck of the container with a play within the limits of 1 to 2 mm. This means that, after being installed on neck 116, cap 112 cannot be disconnected from the container.

In order to seal cap 112 on neck 116, the inner surface of cylindrical wall 132 of cap 112 has a diameter which provides a sliding fit with the outer diameters of projections 124 and 126 on large-diameter portion 118 of neck 116. As a result, with the cap snapped onto neck 116, cap 112 can slide along neck 116 but does not allow oil MO to leak from the container through cap 112. Thus, the sealing of breakable cap 112 on neck 116 of the container is ensured without the use of any additional externally located and manually removable sealing bands of the type which are generally used on sealed oil containers.

FIG. 3—OPERATION OF CONTAINER WITH BREAKABLE POURING CAP

Figure 5:
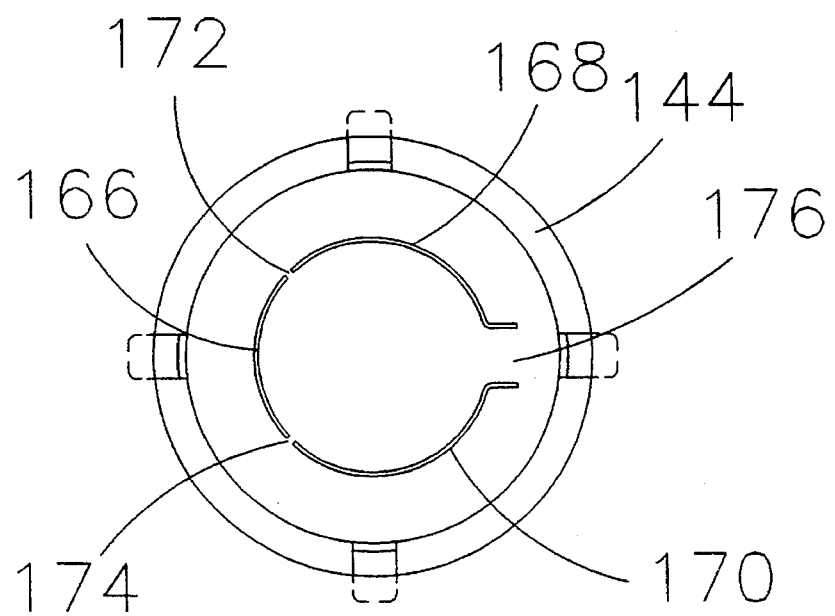
FIG. 5 is a bottom view in the direction of arrow B in FIG. 4.

In order to perform the filling of oil tank 114 with oil MO, opening 111 of the tank is opened, the container is inverted, and its cap 112 is inserted into opening 111 so that ribs 142 are centered on the edges of opening 111 and form gaps therewith (which are similar to gaps 144 shown in FIG. 5 for the second embodiment). The gaps connect the surrounding atmosphere with the interior of tank 114. A slight pressure is then applied to container body 110 to wedge ribs 142 in opening 111 and thus fix cap 112 immovably with respect to tank 114, with a force sufficient to keep cap 112 stationary when container body 110 will be later pushed down.

Body 110 is then pushed down with respect to the now stationary cap 112. At this moment, piercing tip 130 of small-diameter portion 120 pierces the thinned grooved portion 136 of the prescored bottom portion 134 of cap 112. With further downward movement of container body 110, the material of bottom portion 134 will be gradually sheared by peripheral cutting edge 130a of the end face 128 of small-diameter portion 120, which functions as a guillotine knife cutting into the material of breakable bottom portion 134 gradually. As a result, the bottom portion will be bent down in the form of a broken portion 138, and the flow of the viscous oil from the container into the tank will be accelerated. The hands of the user will remain clean and will not come into contact with oil or dirty parts. Broken part 138 will remain attached to cap 112 at unbroken portion 140. As a result, upon completion of the filling operation, the empty container will remain integrally connected to all parts, i.e., to cap 112 and broken portion 138. This facilitates the disposal of the used container.

Once the operation has been completed, the user pulls container body 110 upwardly and disengages cap 112 from opening 111. The container is then discarded.

FIGS. 4 AND 5—EMBODIMENT OF THE CONTAINER WITH PROTECTIVE FILM

Figure 4:
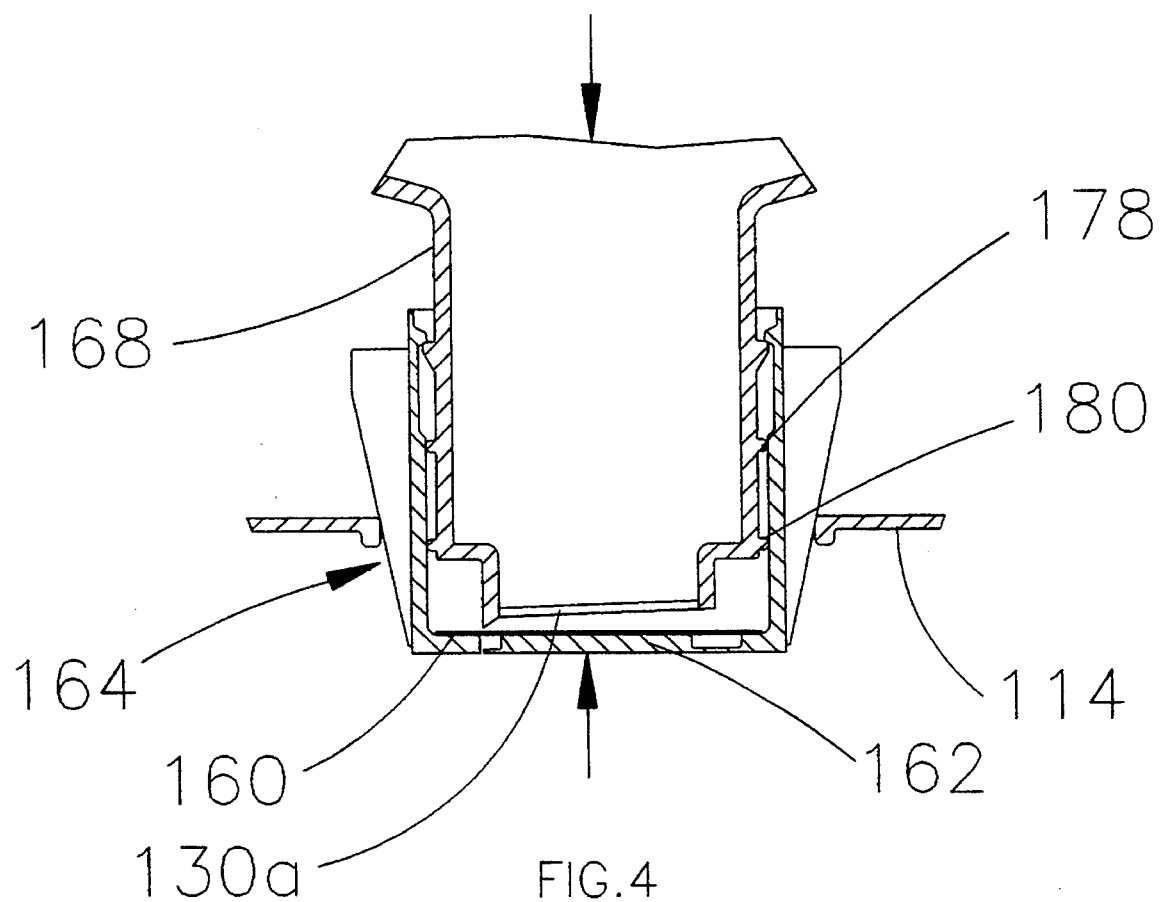
FIG. 4 is a view similar to FIG. 2 illustrating a container made in accordance with a second embodiment of the invention.

The embodiment of an oil container with a breakable cap shown in FIGS. 4 and 5 is, in general, identical to that of the previous embodiment, with the exception that a protective film 160, which is made, e.g., of an aluminum foil, is sealingly attached, e.g., by an adhesive (not shown) to the inner surface of bottom portion 162 of a cylindrical cap 164.

As shown in FIG. 5, which is a bottom view of the container of FIG. 4, arch-shaped slots 166, 168, and 170 are cut through bottom portion 162, leaving only short partitions 172 and 174 and an unbreakable wide portion 176 between the ends of the slots.

Thus, only a very light force has to be applied in order for protective film 160 to be cut, thereby opening the breakable cap, while, in addition to the sliding fit between projections 178, 180 and the inner surface of cap 164, the contents of the container are sealed by protective film 160.

In spite of the fact that during the opening operation breakable cap 164 can be opened with the application of a very low force, the cap is protected from unintended opening because breakable bottom 162 rests on one side of the end-face of the small-diameter portion and is supported on the other side by an unbreakable partition 176.

The mechanism and sequence of operation for opening the container of this embodiment are the same as for the container of FIGS. 2 and 3, with the exception that first protective film 160 is broken and then breakable bottom 162 is broken with the application of a very small force.

Figure 6:
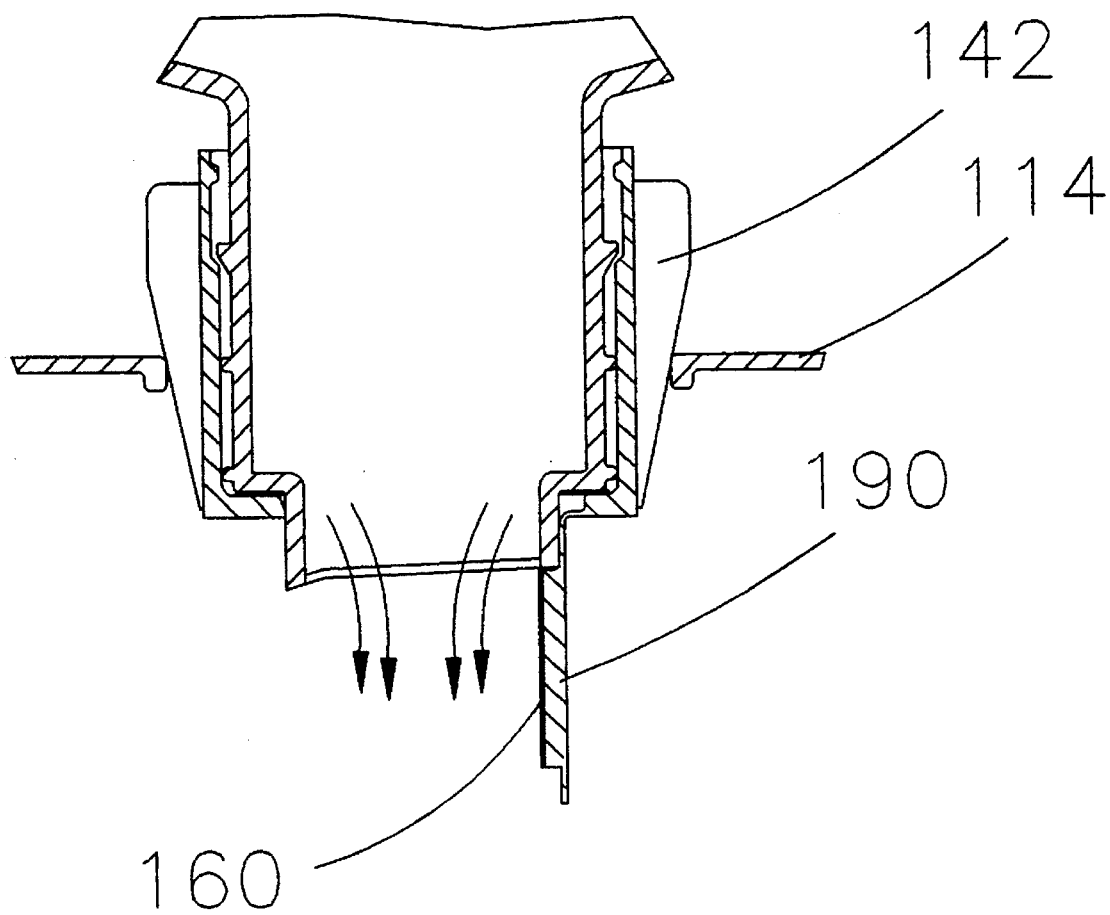
FIG. 6 is a view illustrating the container of FIG. 5 in an opened state.

FIG. 6 is a view illustrating the container of FIG. 5 in an opened state. Arrows in FIGS. 3 and 6 show the direction of the oil pouring out of the container. Reference numeral 190 designates a broken portion of breakable bottom 162 which remains attached to the container after the opening of the cap.

FIGS. 7, 8, AND 9—EMBODIMENT OF THE CONTAINER WITH ADDITIONAL SEALING MEANS

Figure 7:
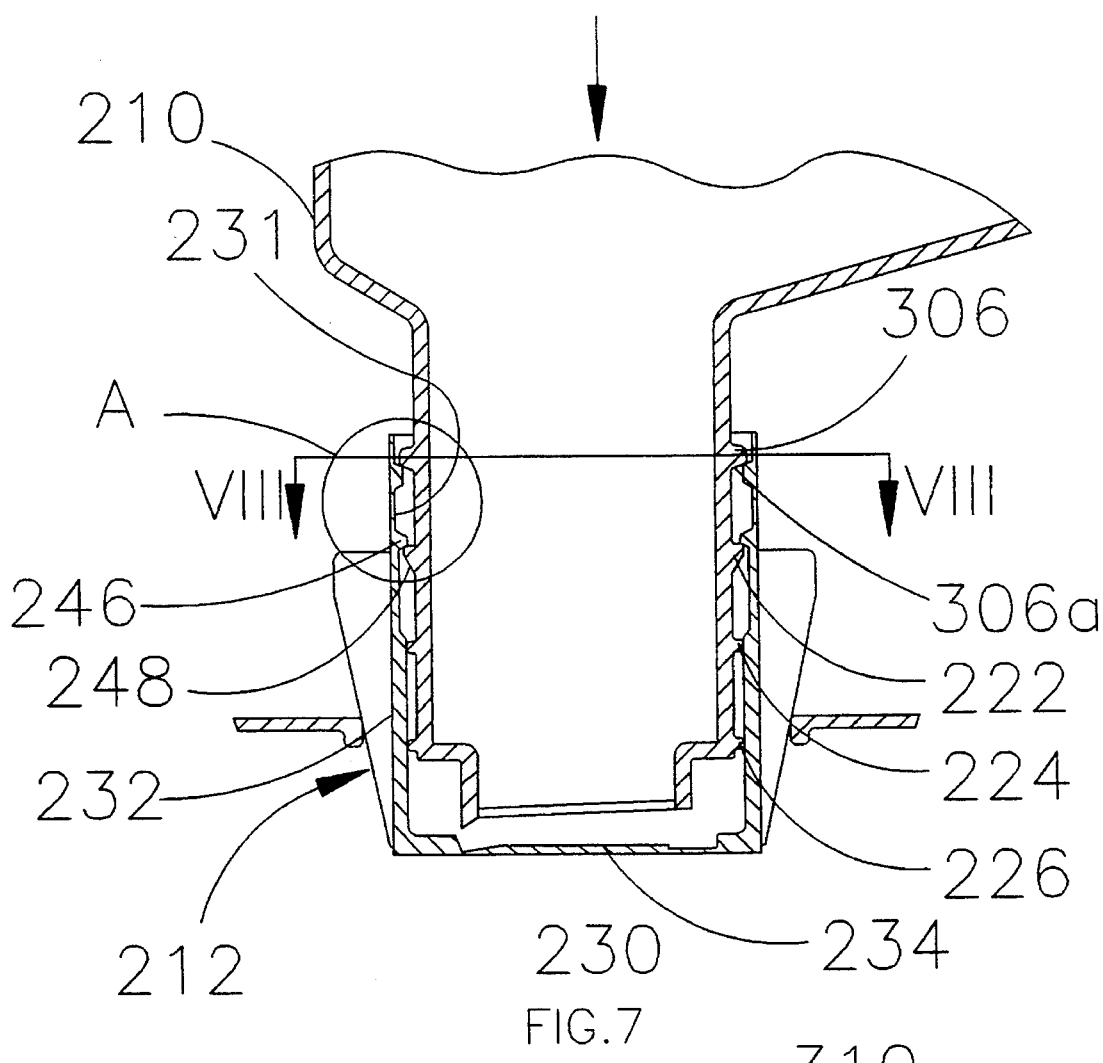
FIG. 7 is a view similar to FIG. 2 illustrating a container made in accordance with a third embodiment of the invention.
Figure 8:
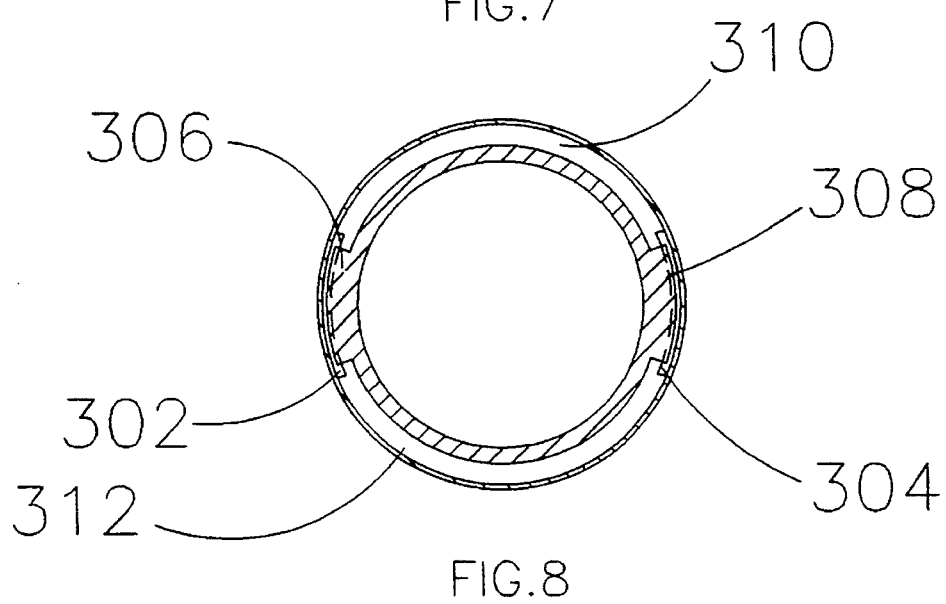
FIG. 8 is sectional view in the direction of lines VIII—VIII of FIG. 7.
Figure 9:
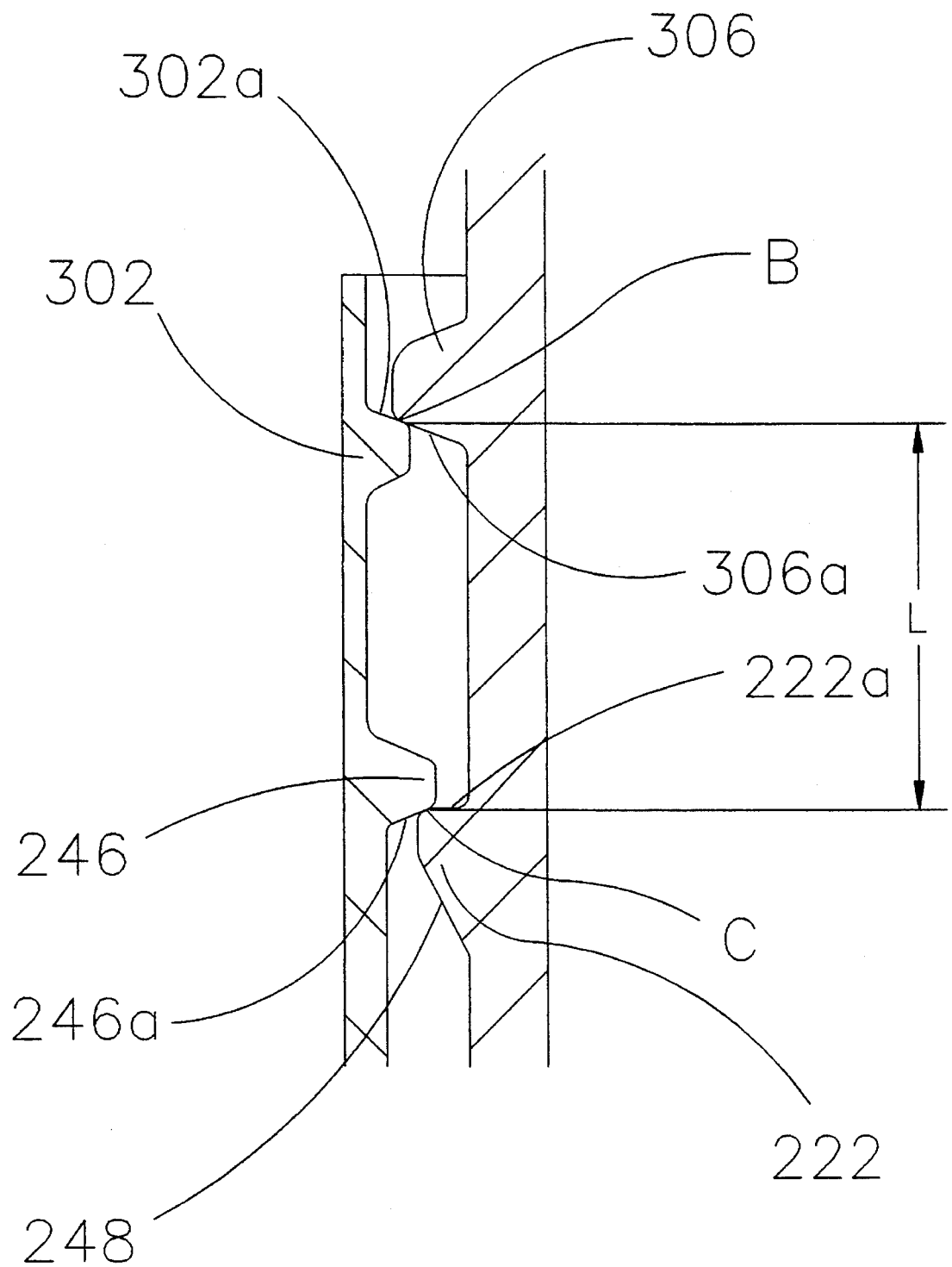
FIG. 9 is detail A of FIG. 7 shown on a larger scale to illustrate the engagement of sealing surfaces.

Still another embodiment of the invention is shown in FIG. 7 which is similar to FIG. 2. FIG. 8 is a sectional view in the direction of lines VIII—VIII of FIG. 7. FIG. 9 is a view of detail A of FIG. 7 on a larger scale illustrating the engagement of sealing surfaces.

As compared to the previous embodiments described with reference to FIGS. 2 to 6, a container 210 of this embodiment ensures more reliable sealing of the cap and protection against occasional opening, such as might have otherwise occurred for example as a result of the container being dropped onto the floor or a similar hard surface; or because of a heavy load which may accidentally have been placed onto the container's cap, pressing the cap's bottom against the cutting edge on the end of the container's neck.

The description of the parts which are similar to those of the previous embodiments will be omitted and designated by the same reference numerals with the addition of 200.

The container of FIGS. 7 and 8 differs from the previous embodiments in that, in addition to the first set of radial inward projections 246 which engage outer projections 222 of neck 216, and to the two annular outward projections 224 and 226 which are in sliding fit with the inner surface 231 of cylindrical wall 232 of cap 212, the cap also has partial inner projections in the form of segments 302 and 304 which are located above projections 246. More specifically, segments 302 and 304 project radially inwardly from inner surface 231 and are located diametrically opposite to each other. In any case, it is required that the angular distance between segments 302 and 304 should be greater than the circumferential length of projections 306 and 308.

Neck 216 has, on its large-diameter portion 218, projections 306 and 308, which also are diametrically opposite to each other and which are located vertically at such a distance from the end face of neck 216 that when cap 212 is placed onto neck 216 of the container, projections 306 and 308 assume a vertical position above segments 302 and 304 and in tight fit therewith. In any case, it is required that the angular distance between segments 302 and 304 should be greater than the circumferential length of projections 306 and 308.

In other words, in order to place cap 212 onto neck 216, projections 306 and 308 should be aligned with spaces 310 and 312 between segments 302 and 308 and then cap 212 should be turned until projections 306 and 308 are aligned with segments 302 and 304, forming a tight fit therewith.

In order to understand the interaction between segments 302, 304 and projections 306, 308, reference should be made to FIG. 9. It can be seen that projections 306 and 308 have tapered lower surfaces (only one of them, i.e., 306a is designated in the drawings). Segments 302 and 304 have mating tapered upper surfaces (only one of them, i.e., 302a is designated in the drawings). When the cap is turned as described above, surfaces 302a and 306a (as well as the corresponding surface of another projection 308 and segment 304) contact each other with a tight fit.

As has been mentioned above, cap 212 has annular radial inward projection 246, while neck 216 has annular radial outward projection 222. When cap 212 is placed onto neck 216 and is turned into the position of contact between surfaces 302a and 306a, these surfaces form lines of contact. In projection of FIG. 9 these lines are represented by points (only point B is shown). When projection 306 contacts segment 302 in point B, upper flat surface 222a of projection 222 contacts lower tapered surface 246a of inner projection 246 in point C. Since the cap and the container are normally made of plastic or another flexible material, in the state of engagement the distance between projections 246 and 302 is reduced because they are compressed between mating outer projection 222 and 306. The distance which is formed in the engaged state between point B of contact of surface 302a with surface 306a and point C of contact of surface 246a with surface 222a is designated by $L_1$ (FIG. 9). In the free state of cap 212 the distance between the corresponding points on surfaces 302a and 246a will be slightly greater than $L_1$, while in the free state of neck 216 the distance between similar points on surfaces 306a and 222a will be slightly smaller than $L_1$. This difference ensures a tight fit in the engaged state of the cap on the container's neck, and thus ensures additional sealing of the container.

In this embodiment, a tip 230 on the very end of neck portion 216 is always spaced from a bottom surface 234 with a guaranteed gap of about 2 to 4 mm. This is necessary in order to prevent contact between the tip and the bottom surface prior to the completion of the sealing operation.

FIGS. 7, 8, AND 9—OPERATION OF THE CONTAINER WITH ADDITIONAL SEALING MEANS

The operation of the container of FIGS. 7, 8, and 9 will be described only with reference to the operation and function of those features of this embodiment which differ from the previous embodiments of this invention.

Once container 210 has been filled with liquid, e.g., motor oil, at the factory, cap 212 is placed over the neck of the container in such a position that projections 306 and 308 coincide with spaces 310 and 312 between segments 302 and 308; cap 212 is then fitted onto the neck portion so that projection 246 of the cap snaps over projection 222 of the neck. The cap is then turned until projections 306 and 308 are aligned with segments 302 and 304. When the cap is turned as described above, surfaces 302a and 306a (as well as the corresponding surface of another projection 308 and segment 304) contact each other with tight fit.

More specifically, when projection 306 contacts segment 302 in point B, upper flat surface 222a of projection 222 contacts lower tapered surface 246a of inner projection 246 in point C. As a result, projections 246 and 302 are compressed between projections 306 and 222. The tight fit between the above projections ensures the reliable sealing of container 210.

In order to open the container, cap 212 should be turned by about 90° with respect to neck 216 so that projections 306 and 308 are disengaged from segments 302 and 304. The container is then opened in the same manner as has been described with regard to the previous embodiments.

SUMMARY, RAMIFICATIONS, AND SCOPE

Thus, it has been shown that we have provided a container having a pouring cap in which the connection between the neck portion and the cap can be reliably sealed without the use of an individual externally located and manually breakable sealing element. In the proposed container, a breakable cap can be opened with the application of a very low force. In spite of the fact that the breakable cap can be opened during the opening operation with a very small force, it is protected from unintended opening.

Although the oil-filling container has been shown and described in the form of specific embodiments, these embodiments, their parts, materials, and configurations have been given only as examples, and many other modifications of the container are possible. For example, the container body may contain liquids other than oil, the container body may have different configurations, the number of ribs may be other than three to six, and so forth. The breakable portion may be only prescored without having a reduced thickness. A very thin bottom portion may be used in the cap instead of prescoring.

Therefore, the scope of the invention should be determined, not by the examples given, but by the appended claims and their legal equivalents.

What we claim is:

1. A container having a breakable pouring cap for pouring a liquid contained in said container into a liquid-receiving tank having an inlet opening, said container comprising:

a container body with a cylindrical neck portion having an opening, a large-diameter portion and a small diameter-portion, said large-diameter portion having an outer surface;

a cap which is installed on said large-diameter neck portion of said container with an annular space defined therebetween;

said cap having an outer surface, an inner surface, and a bottom portion;

radial ribs on said outer surface of said cap for forming an air gap between said cap and said inlet opening, said radial ribs tapering in the direction away from said container body toward said cap;

a breakable portion in said cap which, when broken, opens said container, said breakable portion being a part of said bottom portion of said cap which has a reduced thickness;

a breaking means on said cylindrical neck portion for breaking said breakable portion;

a part of said breakable portion having a thickness greater than said reduced thickness, so that after breaking said breakable portion, said breakable portion remains attached to said cap, said breakable portion being prescored at least on a part of its surface;

at least said cap being made of a flexible material;

an outer annular projection on said outer surface of said neck portion, said outer annular projection having a tapering surface;

an inner annular projection on said inner surface of said cap, said inner annular projection having a tapering surface facing said tapering surface of said outer annular projection of said neck portion;

said tapering surface of said inner annular projection of said cap engaging said tapering surface of said outer annular projection of said neck portion;

inner partial annular projections on said inner surface of said cap, said inner partial annular projections having a tapered surface;

outer partial annular projections on said outer surface of said neck portion having a flat surface, said flat surface of said outer partial annular projections of said neck portion engaging said tapering surface of said inner partial annular projections of said cap;

said outer partial annular projections of said neck portion being circumferentially spaced from each other at the same angular distance as said partial inner annular projections of said cap, said outer partial annular projections of said neck portion having circumferential length shorter than said angular distance;

a distance between said tapering surface of said inner partial annular projections of said cap and said tapering surface of said inner annular projection of said cap in a free state of said cap being greater than a distance between said flat surface of said outer partial annular projections of said neck portion and said tapering surface of said outer annular projection of said neck portion, whereby said tapered surface of said inner annular projection of said cap is in sealing engagement with said tapering surface of said outer annular projection of said neck portion when said inner projections of said cap engage said outer projections of said neck portion; and guide members in said annular space between said cap and said neck.

2. The container of claim 1, wherein said guide members are provided on said outer surface of said neck portion, said guide members slidingly engaging said inner surface of said cap.

3. The container of claim 1, wherein the inside diameter of said annular inner projection of said cap is smaller than the outside diameter of said annular outer projection of said neck portion, whereby said cap can be snapped onto said neck portion.

4. The container of claim 2, wherein the inside diameter of said annular inner projection of said cap is smaller than the outside diameter of said annular outer projection of said neck portion, whereby said cap can be snapped onto said neck portion.

* * * * *